United States Patent
Soma et al.

(10) Patent No.: US 8,084,882 B2
(45) Date of Patent: Dec. 27, 2011

(54) HYBRID VEHICLE

(75) Inventors: Takaya Soma, Toyota (JP); Yoshinori Fujitake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 200 days.

(21) Appl. No.: 12/449,473

(22) PCT Filed: Feb. 18, 2008

(86) PCT No.: PCT/JP2008/053119
§ 371 (c)(1),
(2), (4) Date: Aug. 10, 2009

(87) PCT Pub. No.: WO2008/108192
PCT Pub. Date: Dec. 9, 2008

(65) Prior Publication Data
US 2010/0102628 A1 Apr. 29, 2010

(30) Foreign Application Priority Data
Mar. 7, 2007 (JP) ................................. 2007-057672

(51) Int. Cl.
*B60L 1/00* (2006.01)
(52) U.S. Cl. ........................................................ 307/9.1
(58) Field of Classification Search ................. 307/10.1, 307/9.1
See application file for complete search history.

(56) References Cited

U.S. PATENT DOCUMENTS

| | | | |
|---|---|---|---|
| 5,283,513 A * | 2/1994 | Fujita et al. | 320/138 |
| 7,688,604 B2 * | 3/2010 | Oyobe et al. | 363/40 |
| 2007/0171689 A1 | 7/2007 | Ishikawa et al. | |

FOREIGN PATENT DOCUMENTS

| | | |
|---|---|---|
| JP | A-7-304338 | 11/1995 |
| JP | A-8-37703 | 2/1996 |
| JP | A-8-154307 | 6/1996 |
| JP | A-9-284913 | 10/1997 |
| JP | A-10-136510 | 5/1998 |
| JP | A-11-99838 | 4/1999 |
| JP | A-2000-354331 | 12/2000 |
| JP | A-2005-204361 | 7/2005 |

OTHER PUBLICATIONS

"Commencement of Collaborative Development of Industrial Electric Cars for the Tokyo Electric Power Company, Inc.;" *The Tokyo Electric Power Company, Inc./Fuji Heavy Industries, Ltd.*; Sep. 2, 2005.

* cited by examiner

*Primary Examiner* — Robert L. Deberadinis
(74) *Attorney, Agent, or Firm* — Oliff & Berridge, PLC

(57) ABSTRACT

A hybrid vehicle includes an internal combustion engine capable of generating motive power, a motor capable of generating motive power, a driving mechanism accommodation room capable of accommodating the motor and the internal combustion engine, a power storage, a first connection unit provided to be capable of receiving a first outside connection unit, the first connection unit being capable of supplying power to the power storage, and a second connection unit provided to be capable of receiving a second outside connection unit through which a current higher than in the first outside connection unit can pass, the second connection unit being capable of supplying power to the power storage, and the second connection unit being provided farther away from the driving mechanism accommodation room than the first connection unit is.

14 Claims, 6 Drawing Sheets

HYBRID VEHICLE

TECHNICAL FIELD

The present invention relates to a hybrid vehicle, and more particularly to a hybrid vehicle including a first connection unit capable of receiving a first outside connection unit through which a low current passes, and a second connection unit capable of receiving a second outside connection unit through which a current higher than in the first connection unit can pass.

BACKGROUND ART

Conventionally, there have been proposed various kinds of environmentally friendly hybrid cars and the like. For example, Japanese Patent Laying-Open No. 8-154307 proposes a hybrid vehicle which guides a driver to travel without relying on an internal combustion engine to thereby reduce air pollution.

According to Japanese Patent Laying-Open No. 2000-354331, a charging device includes charging means for charging from a 100V commercial power supply and charging means for charging from a 200V commercial power supply in a vehicle.

In this vehicle, a 100V commercial power supply can be connected to a port provided in the vehicle, thereby charging a battery. When using a 200V commercial power supply to perform charging, the 200V commercial power supply is connected to a ground-based charger provided separately from the vehicle, and the ground-based charger is connected to the port of the vehicle, to perform charging.

Further, a paper entitled "Commencement of Collaborative Development of Industrial Electric Cars for The Tokyo Electric Power Company, Inc. (Sep. 2, 2005, The Tokyo Electric Power Company, Inc./Fuji Heavy Industries Ltd.)" proposes an electric car in which a vehicle-mounted charger can be charged by converting an alternating current of 100V to a direct current 400V, while a lithium-ion battery can be charged by converting a 200V alternating current to a direct current of 400V.

For the hybrid vehicle described in Japanese Patent Laying-Open No. 8-154307, however, no description is given of means for charging from two power supplies having different voltages.

Moreover, for the vehicle described in Japanese Patent Laying-Open No. 2000-354331, positions in the vehicle of a connector to which the 100V commercial power supply is connected and of the port to which the 200V commercial power supply is connected via the ground-based charger are not clearly described.

In the electric car described in the paper entitled "Commencement of Collaborative Development of Industrial Electric Cars for The Tokyo Electric Power Company, Inc.," the positions of a connection unit to which a 100V commercial power supply is connected and of a connection unit to which a 200V commercial power supply is connected are both provided in a rear end portion of a vehicle main body.

Unlike electric cars, however, hybrid vehicles have an engine mounted thereon that will reach high temperatures, and depending on positional relationship with this engine, each of port and connector requires heat-resistant treatment. It is extremely difficult, particularly for a port through which a high current passes to be subjected to heat-resistant treatment completely. The above paper and the above patent documents do not provide any description or suggestion whatsoever about such problems.

DISCLOSURE OF THE INVENTION

The present invention was made in view of the above-described problems, and an object thereof is to provide a hybrid vehicle including a first connection unit capable of receiving a first outside connection unit through which a low current passes, and a second connection unit capable of receiving a second outside connection unit through which a high current passes, achieving less strict heat-resistant conditions required for the second connection unit.

A hybrid vehicle according to the present invention includes an internal combustion engine capable of generating motive power, a motor capable of generating motive power for driving wheels, a driving mechanism accommodation room capable of accommodating the motor and the internal combustion engine, and a power storage capable of storing power for driving the motor. The hybrid vehicle also includes a first connection unit provided to be capable of receiving a first outside connection unit, the first connection unit being capable of supplying power to the power storage or/and capable of supplying power stored in the power storage to the outside, and a second connection unit provided to be capable of receiving a second outside connection unit through which a current higher than in the first outside connection unit can pass, the second connection unit being capable of supplying power to the power storage or/and capable of supplying power stored in the power storage to the outside, and the second connection unit being provided farther away from the driving mechanism accommodation room than the first connection unit is.

Preferably, the hybrid vehicle further includes a traveler accommodation room capable of accommodating travelers, the driving mechanism accommodation room is located on the front side in a traveling direction with respect to the traveler accommodation room, and the first connection unit is provided on the front side in the traveling direction with respect to the second connection unit, and connected to the power storage via the motor.

Preferably, the hybrid vehicle further includes a converter capable of converting power supplied from the second connection unit and supplying resultant power to the power storage or/and capable of converting power supplied from the power storage and supplying resultant power to the second connection unit, the second connection unit is connected to the power storage via the converter, and the power storage is provided on the rear side in the traveling direction with respect to the driving mechanism accommodation room.

Preferably, the first connection unit is provided on a front end surface located on the front side in the traveling direction, and the second connection unit is provided on a rear end surface located on the rear side in the traveling direction.

Preferably, the motor includes a first motor having a first polyphase winding and a first neutral point of the first polyphase winding, and a second motor having a second polyphase winding and a second neutral point of the second polyphase winding, and the first connection unit includes a first line connected to the first neutral point and a second line connected to the second neutral point. The hybrid vehicle further includes a first inverter capable of supplying power from the power storage to the first motor, a second inverter capable of supplying power from the power storage to the second motor, and an inverter control unit controlling the first and second inverters, and the inverter control unit is capable of controlling the first and second inverters such that alternating-current power provided from the first connection unit to the first and second neutral points is converted to direct-current power and supplied to the power storage, or/and capable of controlling the first and second inverters such that a direct power supplied from the power storage to the first and second inverters is converted to an alternating power and supplied from the first connection unit to an external load.

Preferably, the motor includes a first motor having a first polyphase winding and a first neutral point of the first polyphase winding, and a second motor having a second polyphase winding and a second neutral point of the second polyphase winding. The first connection unit includes a first line connected to the first neutral point and a second line connected to the second neutral point. In addition, the hybrid vehicle further includes a first inverter capable of supplying power from the power storage to the first motor, a second inverter capable of supplying power from the power storage to the second motor, and an inverter control unit controlling the first and second inverters. The inverter control unit is capable of controlling the first and second inverters such that alternating-current power provided from the outside of the vehicle to the first and second neutral points through the first connection unit is converted to direct-current power and output to the power storage.

It is noted that two or more of the above-described features may be combined as appropriate.

According to the hybrid vehicle of the present invention, the second connection unit to be connected to the second outside connection unit through which a high current passes is provided in a position away from the internal combustion engine that will reach high temperatures. Therefore, conduction of heat generated in the internal combustion engine to the second connection unit is suppressed, thereby reducing the need for heat-resistant treatment on the second connection unit.

BEST MODES FOR CARRYING OUT THE INVENTION

Figure 1:
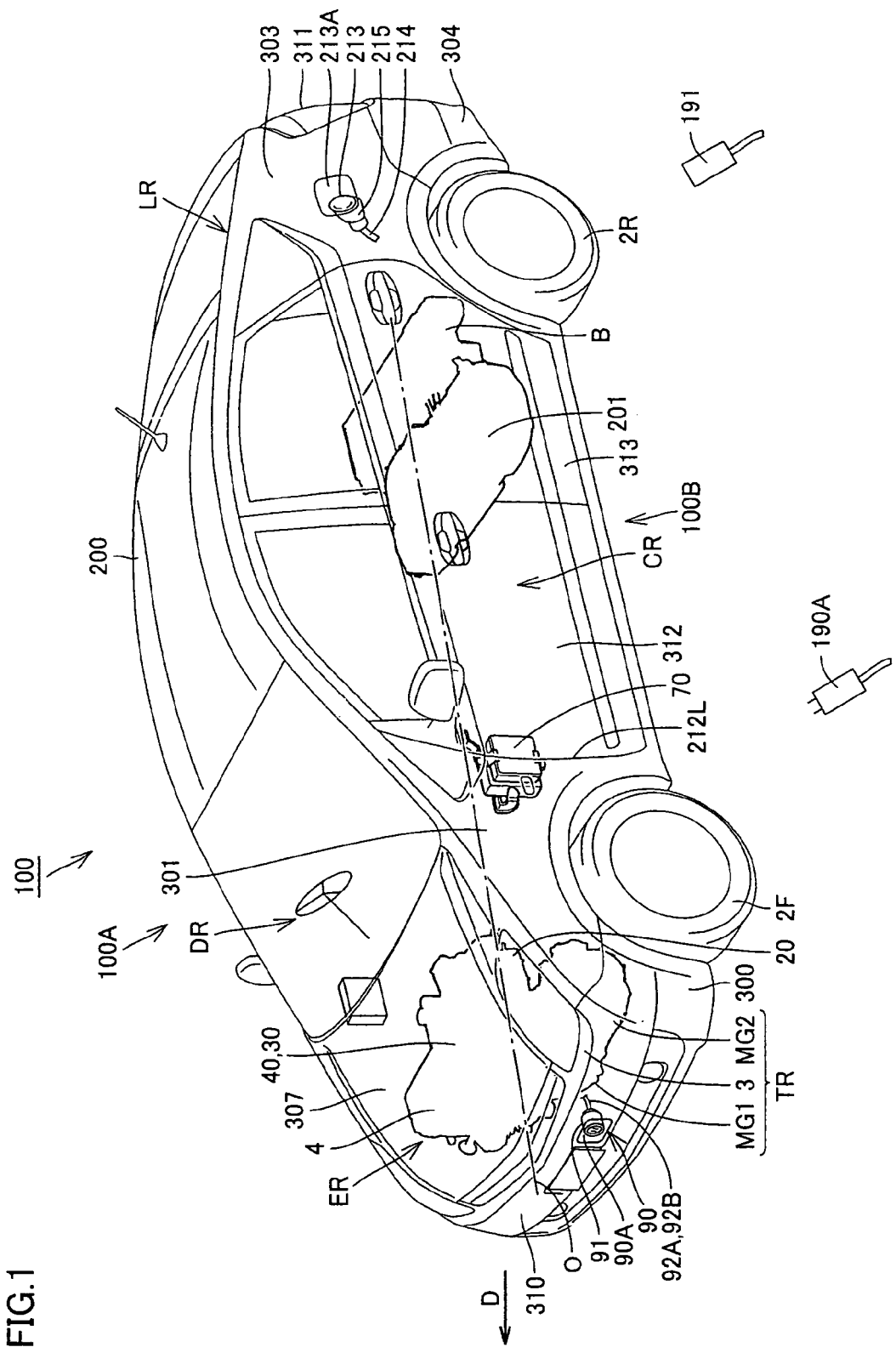
FIG. 1 is a perspective view from the front side of a hybrid vehicle according to an embodiment.
Figure 2:
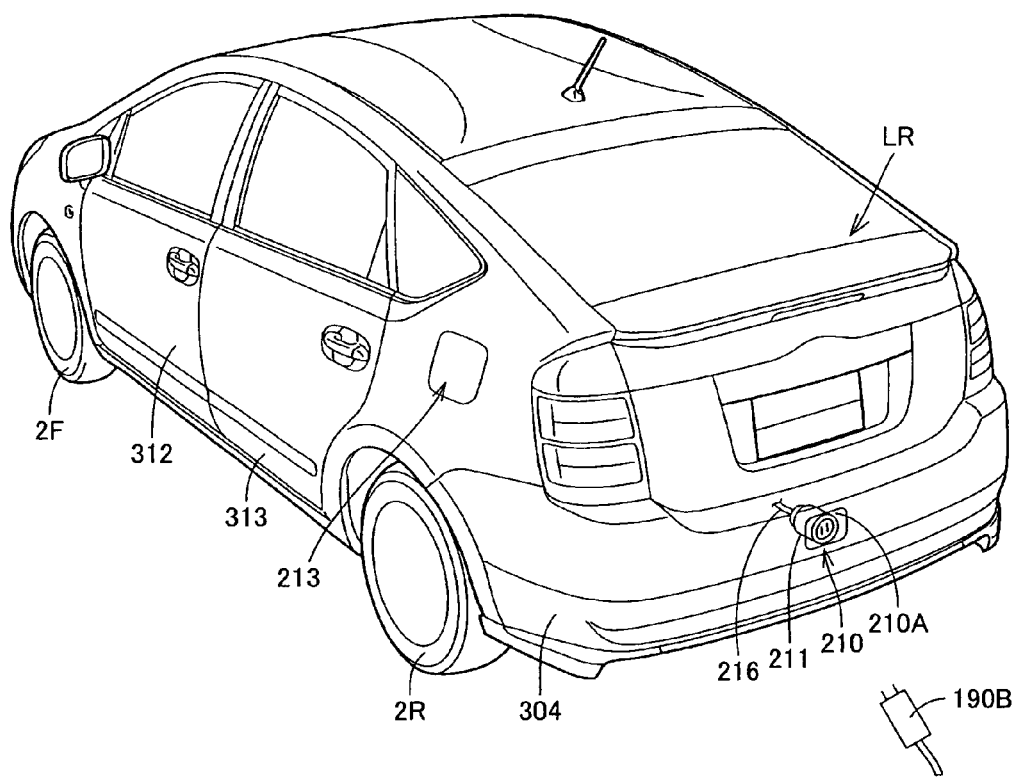
FIG. 2 is a perspective view from the rear side of the hybrid vehicle according to the embodiment.

With reference to FIGS. 1 to 6, a hybrid vehicle 100 according to the present embodiment will be described. The same or corresponding components are designated with the same characters, and the description thereof will not be repeated. FIG. 1 is a perspective view from the front side of hybrid vehicle 100 according to the present embodiment. FIG. 2 is a perspective view from the rear side.

In FIGS. 1 and 2, hybrid vehicle 100 includes a vehicle main body 200 constituted of a body and exterior parts, and front wheels 2F, rear wheels 2R which are provided in pairs on the front side and the rear side of vehicle main body 200, respectively.

Vehicle main body 200 includes an engine compartment ER provided on the front side in a traveling direction of hybrid vehicle 100, a traveler accommodation room CR which is located on the rear side in a traveling direction D with respect to this engine compartment ER and is capable of accommodating travelers, and a luggage room LR located on the rear side in traveling direction D with respect to traveler accommodation room CR.

Figure 3:
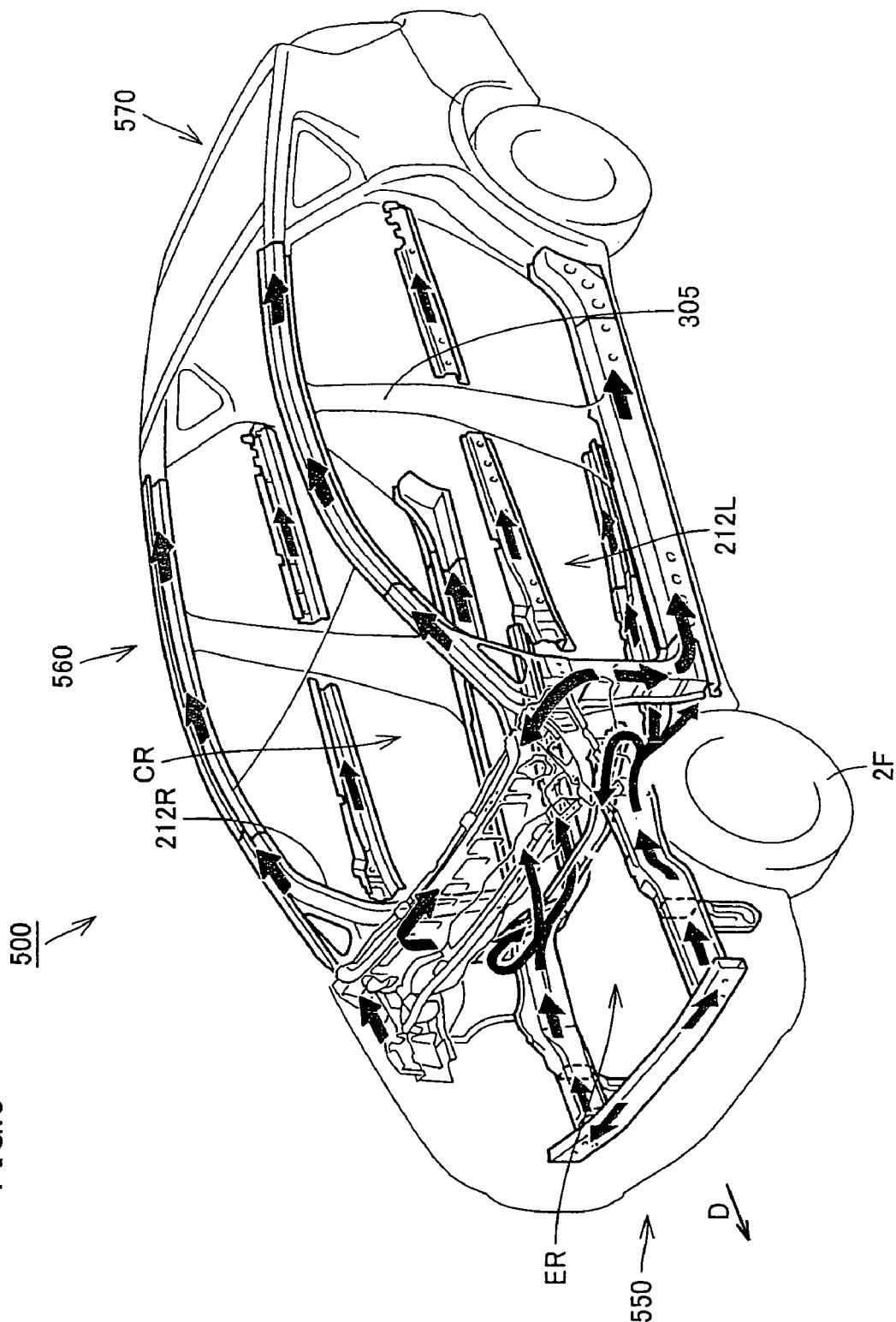
FIG. 3 is a perspective view showing a body of the vehicle main body.

FIG. 3 is a perspective view showing a body 500 of vehicle main body 200. As shown in FIG. 3, a monocoque body is employed, for example, as body 500 of vehicle main body 200. This body 500 includes a front wall portion 550 provided on the front surface side in traveling direction D and defining engine compartment ER, an accommodation wall portion 560 defining traveler accommodation room CR, and a rear wall portion 570 provided on the rear side in traveling direction D of vehicle main body 200 with respect to this accommodation wall portion 560.

Formed on the side surfaces of this body 500 are openings 212L, 212R which connect to traveler accommodation room CR, and through which a traveler can get in or out of the vehicle. A plurality of exterior parts are mounted on the surface of body 500 thus structured, to form vehicle main body 200.

For example, as shown in FIGS. 1 and 2, the exterior parts include a front face 310 provided on the front surface side of vehicle main body 200, a front bumper 300 provided under this front face 310, a front fender 301 provided to cover the side surface of front wall portion 550 shown in FIG. 3, and a front door 312 and a rear door 313 provided to permit opening and closing of openings 212L, 212R in FIG. 1.

The exterior parts also include a hood 307 as an upper lid of engine compartment ER, a rear fender 303 provided on the rear side in traveling direction D with respect to rear door 313, and a rear bumper 304 provided below rear fender 303.

Traveler accommodation room CR is provided with a driving seat DR for operating hybrid vehicle 100, a passenger seat adjacent to the driving seat in the width direction of hybrid vehicle 100, and a rear seat provided behind these passenger seat and driving seat DR. In this example shown in FIG. 1, driving seat DR is offset toward a right side surface (one side surface) 100A of hybrid vehicle 100 with respect to a center line O of hybrid vehicle 100 that extends in traveling direction D.

As shown in FIG. 1, in a portion located below the rear seat in traveler accommodation room CR, a fuel tank 201 which accommodates liquid fuel such as gasoline is provided, and a battery (power storage) B such as a fuel cell or a large-capacity capacitor is arranged behind the rear seat in traveling direction D. In this manner, battery B is located on the rear side in traveling direction D with respect to engine compartment ER. Fuel tank 201 can be filled with fuel via a refueling unit 213 provided to be capable of receiving a refueling connector 191. Refueling unit 213 includes a nozzle-receiving unit 215 capable of receiving a nozzle of refueling connector 191, a refueling pipe 214 connecting this nozzle-receiving unit 215 and fuel tank 201 to each other, and a pivotably provided lid unit 213A.

Engine compartment ER accommodates an engine of an internal combustion engine (internal combustion engine) 4 which generates motive power for driving front wheels 2F, and a transaxle TR. Transaxle TR includes a motor MG1 capable of generating motive power for driving front wheels 2F, a motor MG2 capable of functioning as a generator through the motive power from engine 4, a boost converter 20 which raises a voltage of power from battery B, inverters 30, 40 which convert direct-current power from boost converter 20 to alternating-current power and supply resultant alternating-current power to motors MG1, MG2, a power split device 3 formed of a planetary gear and the like, and a reduction gear 1 which transmits motive power to a shaft connected to front wheels 2F.

Engine 4 is offset toward side surface 100A with respect to center line O, and transaxle TR is offset toward a side surface 100B. Therefore, the center of gravity when engine 4 and transaxle TR are seen in an integrated fashion is located on or in the vicinity of center line O, thereby achieving the balance in the width direction of hybrid vehicle 100.

Further, the centers of gravity of battery B and fuel tank 201 are both located on or in the vicinity of center line O.

Figure 4:
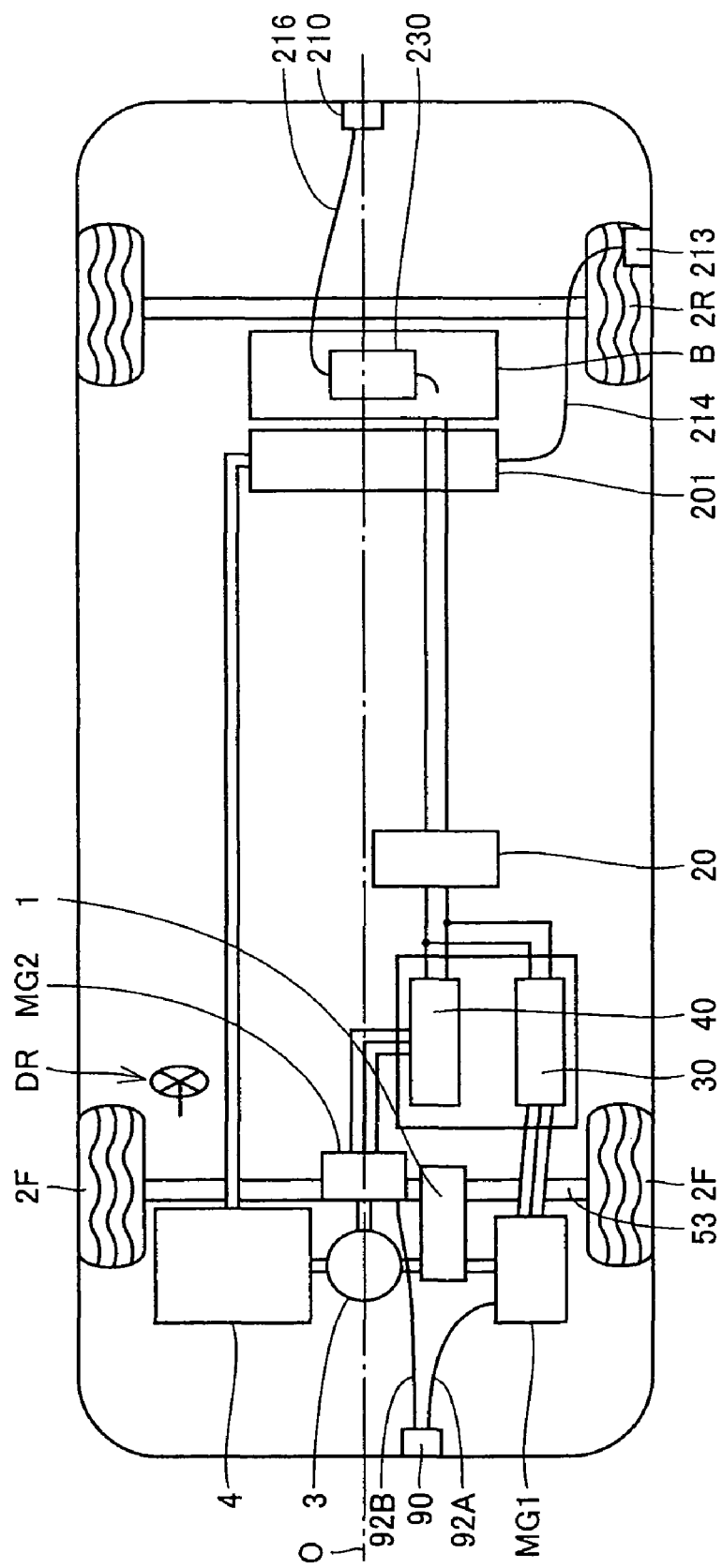
FIG. 4 is a block diagram showing a schematic structure of the hybrid vehicle.

FIG. 4 is a block diagram showing the schematic structure of hybrid vehicle 100.

Here, as shown in FIGS. 1, 2 and 4, hybrid vehicle 100 is provided with, for example, a low-voltage charging and power-feeding unit (first connection unit) 90 to be connected to a connector (first outside connection unit) 190A connected to a commercial power supply of 100V, and, for example, a high-voltage charging and power-feeding unit (second connection unit) 210 to be connected to a connector (second outside connection unit) 190B through which a current of 200V having a voltage higher than the current that passes through connector 190A passes.

Here, each of connectors 190A, 190B includes both a charging connector which supplies power to battery B to charge battery B, and an outside power-feeding connector which supplies power stored in vehicle-mounted battery B to an outside battery and the like. Further, each of connectors 190A, 190B includes a charging and power-feeding connector which combines the functions of the above charging connector and power-feeding connector.

It is noted that a method of supplying and receiving power between connector 190A and low-voltage charging and power-feeding unit 90 and a method of supplying and receiving power between connector 190B and high-voltage charging and power-feeding unit 210 may be of a contact type (contactive) in which at least part of each connector 190A, 190B and at least part of each power-feeding and charging unit come in direct contact with each other, or may be of a non-contact type (incontactive).

In FIG. 2, high-voltage charging and power-feeding unit 210 includes an outlet unit 211 capable of receiving connector 190B, a lid member 210A covering this outlet unit 211, that can be opened and closed, and a line 216 connected to the outlet unit 211.

High-voltage charging and power-feeding unit 210 is provided on the rear side in traveling direction D with respect to engine compartment ER.

By arranging high-voltage charging and power-feeding unit 210 in such a position, the effect of heat from engine 4 on high-voltage charging and power-feeding unit 210 may be reduced. This eliminates the need for heat-resistant measures on this high-voltage charging and power-feeding unit 210, thereby cutting production costs. Further, damage caused by heat may be suppressed, thereby suppressing occurrence of leakage and the like.

Here, because the current passing through high-voltage charging and power-feeding unit 210 is higher than the current passing through low-voltage charging and power-feeding unit 90, when ensuring heat resistance to the same degree to suppress occurrence of drawbacks such as leakage, heat resistance can be ensured more easily for low-voltage charging and power-feeding unit 90.

High-voltage charging and power-feeding unit 210 has line 216 connected to a non-contact type converter 230 such as a transformer, as shown in FIG. 3, and is connected to converter 230 and also to battery B via the line. In this manner, high-voltage charging and power-feeding unit 210 is connected to battery B via converter 230. Although a non-contact type converter is employed as the converter in the present embodiment, the present embodiment is not limited thereto, and may employ a contact type converter. In addition, an alternating current supplied from high-voltage charging and power-feeding unit 210 can be converted to a direct current, and supplied to battery B through voltage conversion. Further, this converter 230 can convert a direct current from battery B to an alternating current, and supply resultant alternating current to high-voltage charging and power-feeding unit 210 through voltage conversion.

Battery B is located on the rear side in traveling direction D with respect to engine compartment ER as described above, and converter 230 is located around battery B, preferably arranged on the upper surface of battery B. Since all of high-voltage charging and power-feeding unit 210, converter 230, and battery B are located on the rear side in traveling direction D with respect to engine compartment ER in this manner, both a line length between high-voltage charging and power-feeding unit 210 and converter 230, and a line length between converter 230 and battery B may be reduced. Such reduction in each line length improves charging efficiency to battery B, while reducing generated noise.

Since battery B is arranged on the rear side in traveling direction D with respect to engine compartment ER., even if external force is applied from the side of a front surface portion of hybrid vehicle 100, application of significant impact force to battery B, which is sensitive to impact force, may be suppressed.

In this manner, as battery B can be charged using a current having a higher voltage than a household power supply of 100V, charging to battery B can be completed in a short time.

It is noted that the power stored in battery B can be supplied to an external load via high-voltage charging and power-feeding unit 210. This allows an operation of charging an outside power storage to be completed in a short time.

In FIG. 1, low-voltage charging and power-feeding unit 90 includes an outlet unit 91 to be connected to connector 190A, a lid member 90A provided to cover this outlet unit 91, and lines 92A, 92B connected to the outlet unit 91 and to motors MG1, MG2.

As described above, because the current passing through low-voltage charging and power-feeding unit 90 has a lower voltage than that of the current passing through high-voltage charging and power-feeding unit 210, when ensuring heat resistance to suppress leakage, heat resistance can be ensured relatively easily for low-voltage charging and power-feeding unit 90. For this reason, low-voltage charging and power-feeding unit 90 is arranged to be closer to the side of engine compartment ER than high-voltage charging and power-feeding unit 210 is.

Further, low-voltage charging and power-feeding unit 90 is arranged to be closer to the front side in traveling direction D than high-voltage charging and power-feeding unit 210 is. Specifically, low-voltage charging and power-feeding unit 90 is arranged at or in the vicinity of a portion of vehicle main body 200 that defines engine compartment ER, which leads to reduction in line length between low-voltage charging and power-feeding unit 90 and motors MG1, MG2.

Such reduction in line length between low-voltage charging and power-feeding unit 90 and motors MG1, MG2 may reduce generation of noise, while improving charging efficiency to battery B and charging efficiency to an external load (outside power storage).

Here, since lines 92A, 92B are connected to motors MG1, MG2 accommodated in engine compartment ER, at least a part of each line 92A, 92B has also been subjected to heat-resistant treatment.

In the example as shown in FIG. 1, low-voltage charging and power-feeding unit 90 is provided on front face 310 located on the front side in traveling direction D of hybrid vehicle 100, and high-voltage charging and power-feeding unit 210 is provided on rear bumper 304 located on the rear side in traveling direction D. As such, low-voltage charging and power-feeding unit 90 is close to motors MG1, MG2, and further, high-voltage charging and power-feeding unit 210 is close to battery B.

That is, by providing high-voltage charging and power-feeding unit 210 in a position away from engine compartment ER and by arranging low-voltage charging and power-feeding unit 90, which is more easily subjected to heat-resistant treatment than high-voltage charging and power-feeding unit 210, around or in the vicinity of engine compartment ER, manufacturing costs may be cut and each line length may be reduced.

Accordingly, when engine compartment ER is located on the front side in the traveling direction of hybrid vehicle 100 as in the present embodiment, low-voltage charging and power-feeding unit 90 should only be located on the front side in traveling direction D with respect to openings 212L, 212R of hybrid vehicle 100, and high-voltage charging and power-feeding unit 210 should only be located on the rear side in traveling direction D with respect to openings 212L, 212R.

Here, in general, it is known that portions of hybrid vehicle 100 which have a tendency to come into contact with the outside as a result of many years of use are each corner portion of hybrid vehicle 100.

Low-voltage charging and power-feeding unit 90 is located on front face 310 or front bumper 300, in the central portion and in the vicinity thereof in the width direction of hybrid vehicle 100. Further, high-voltage charging and power-feeding unit 210 is located on rear bumper 304, also in the central portion in the width direction of hybrid vehicle 100.

Therefore, in the course of use of hybrid vehicle 100, contact with outside members and damage caused thereby of high-voltage charging and power-feeding unit 210 and low-voltage charging and power-feeding unit 90 may be suppressed.

It is known that many of damaged portions of hybrid vehicle 100 as a result of use are corner portions of front face 310, front bumper 300 and rear bumper 304, located on the side opposite to driving seat DR.

In view of this, low-voltage charging and power-feeding unit 90 may be arranged on front face 310 and front bumper 300, in a region located between a corner portion on the side of driving seat DR and the central portion in the width direction. Further, high-voltage charging and power-feeding unit 210 may be arranged on rear bumper 304, in a portion located between a corner portion on the side of driving seat DR and the central portion in the width direction.

By arranging low-voltage charging and power-feeding unit 90 and high-voltage charging and power-feeding unit 210 in such positions, damage to low-voltage charging and power-feeding unit 90 and high-voltage charging and power-feeding unit 210 may be reduced.

Moreover, a driver may perform, with low-voltage charging and power-feeding unit 90 and high-voltage charging and power-feeding unit 210 close to driving seat DR, a charging operation to battery B and a power-feeding operation of feeding power stored in battery B to an external load.

Figure 5:
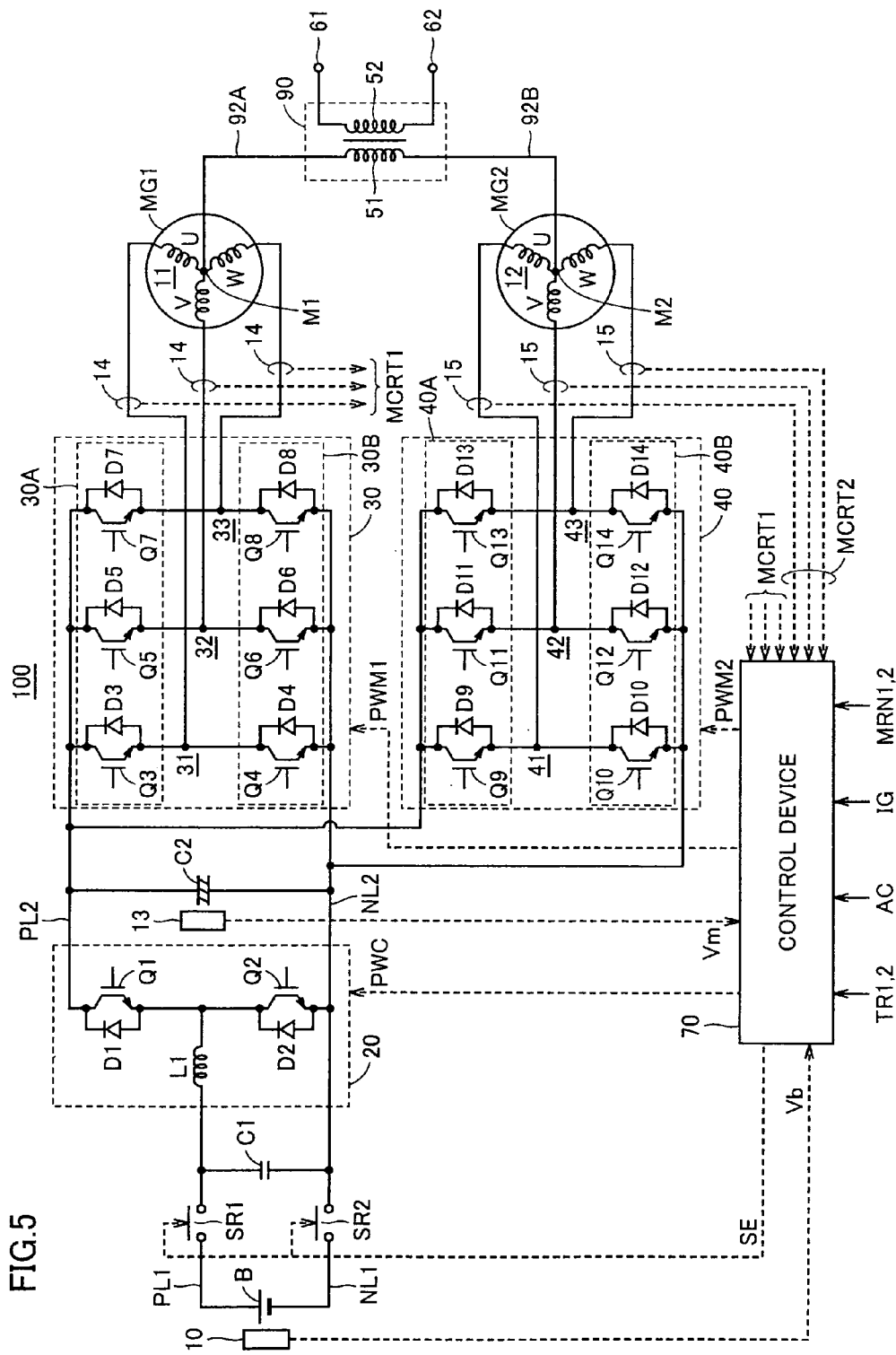
FIG. 5 is a schematic block diagram of the hybrid vehicle during charging to an outside component.

FIG. 5 is a schematic block diagram of hybrid vehicle 100 in the present embodiment. With reference to FIG. 5, a method of feeding direct-current power stored in battery B to an external load via connector 190A will be described.

Battery B has a positive electrode connected to a positive electrode line PL1, and battery B has a negative electrode connected to a negative electrode line NL1. A capacitor C1 is connected between positive electrode line PL1 and negative electrode line NL1. Boost converter 20 is connected between positive electrode line PL1 and negative electrode line NL1, and a positive electrode line PL2 and a negative electrode line NL2. A capacitor C2 is connected between positive electrode line PL2 and negative electrode line NL2. Inverter 30 is connected between positive electrode line PL2 and negative electrode line NL2, and motor MG1. Inverter 40 is connected between positive electrode line PL2 and negative electrode line NL2, and motor MG2.

Motor MG1 includes a three-phase coil 11 as a stator coil, and motor MG2 includes a three-phase coil 12 as a stator coil.

Boost converter 20 includes a reactor Li, NPN transistors Q1, Q2, and diodes D1, D2. Reactor L1 has one end connected to positive electrode line PL1, and the other end connected to the midpoint between NPN transistor Q1 and NPN transistor Q2, i.e., connected between an emitter of NPN transistor Q1 and a collector of NPN transistor Q2. NPN transistors Q1, Q2 are connected in series between positive electrode line PL1 and negative electrode lines NL1, NL2. NPN transistor Q1 has a collector connected to positive electrode line PL2 of inverters 30, 40, and NPN transistor Q2 has an emitter connected to negative electrode lines NL1, NL2. Between the collectors and the emitters of respective NPN transistors Q1, Q2, diodes D1, D2 passing a current from the emitter side to the collector side are arranged, respectively.

Inverter 30 is constituted of a U-phase arm 31, a V-phase arm 32, and a W-phase arm 33. U-phase arm 31, V-phase arm 32, and W-phase arm 33 are provided in parallel between positive electrode line PL2 and negative electrode line NL2.

U-phase arm 31 is constituted of NPN transistors Q3, Q4 connected in series, V-phase arm 32 is constituted of NPN transistors Q5, Q6 connected in series, and W-phase arm 33 is constituted of NPN transistors Q7, Q8 connected in series. Between the collectors and the emitters of respective NPN transistors Q3 to Q8, diodes D3 to D8 passing a current from the emitter side to the collector side are connected, respectively.

The midpoint of the arm of each phase of inverter 30 is connected to an end of each phase of the coil of each phase of three-phase coil 11 included in motor MG1. That is, motor MG1 is a three-phase permanent magnet motor in which the respective one ends of the three U-, V-, and W-phase coils are all configured to be connected to a neutral point M1, with the other end of the U-phase coil being connected to the midpoint between NPN transistors Q3 and Q4, the other end of the V-phase coil being connected to the midpoint between NPN transistors Q5 and Q6, and the other end of the W-phase coil being connected to the midpoint between NPN transistors Q7 and Q8, respectively.

Inverter 40 is connected to opposing ends of capacitor C2 in parallel to inverter 30. Inverter 40 is constituted of a U-phase arm 41, a V-phase arm 42, and a W-phase arm 43. U-phase arm 41, V-phase arm 42, and W-phase arm 43 are provided in parallel between positive electrode line PL2 and negative electrode line NL2.

U-phase arm 41 is constituted of NPN transistors Q9, Q10 connected in series, V-phase arm 42 is constituted of NPN transistors Q11, Q12 connected in series, and W-phase arm 43 is constituted of NPN transistors Q13, Q14 connected in series. NPN transistors Q9 to Q14 correspond to NPN transistors Q3 to Q8 of inverter 30, respectively. Namely, inverter 40 has the same configuration as that of inverter 30. Between the collectors and the emitters of NPN transistors Q9 to Q14, diodes D9 to D14 passing a current from the emitter side to the collector side are connected, respectively.

The midpoint of the arm of each phase of inverter 40 is connected to an end of each phase of the coil of each phase of three-phase coil 12 included in motor MG2. That is, motor MG2 is also a three-phase permanent magnet motor in which the respective one ends of the three U-, V-, and W-phase coils are all configured to be connected to a neutral point M2, with the other end of the U-phase coil being connected to the midpoint between NPN transistors Q9 and Q10, the other end of the V-phase coil being connected to the midpoint between NPN transistors Q11 and Q12, and the other end of the W-phase coil being connected to the midpoint between NPN transistors Q13 and Q14, respectively.

Battery B is made of a secondary battery such as a nickel metal hydride battery or a lithium-ion battery. A voltage sensor 10 detects a battery voltage Vb output from battery B, and outputs that detected battery voltage Vb to a control device 70. System relays SR1, SR2 are turned ON/OFF in response to a signal SE from control device 70. More specifically, system relays SR1 SR2 are turned ON in response to signal SE of H (logic high) level from control device 70, and turned OFF in response to signal SE of L (logic low) level from control device 70. Capacitor C1 smoothes a direct-current voltage supplied from battery B, and supplies the smoothed direct-current voltage to boost converter 20.

Boost converter 20 boosts the direct-current voltage supplied from capacitor C1, and supplies resultant direct-current voltage to capacitor C2. More specifically, upon receiving a signal PWC from control device 70, boost converter 20 boosts the direct-current voltage and supplies resultant direct-current voltage to capacitor C2 in accordance with a period of time during which NPN transistor Q2 is rendered ON in response to signal PWC. In this case, NPN transistor Q1 is turned OFF in response to signal PWC. Further, in response to signal PWC from control device 70, boost converter 20 down-converts a direct-current voltage supplied from inverter 30 and/or 40 via capacitor C2, to charge battery B.

Capacitor C2 smoothes the direct-current voltage from boost converter 20, and supplies the smoothed direct-current voltage to inverters 30, 40. A voltage sensor 13 detects a voltage across capacitor C2, i.e., an output voltage Vm from boost converter 20 (which corresponds to an input voltage to inverters 30, 40; the same being applicable hereinafter), and outputs that detected output voltage Vm to control device 70.

When supplied with the direct-current voltage from capacitor C2, inverter 30 converts the direct-current voltage to an alternating-current voltage to drive motor MG1 based on a signal PWM1 from control device 70. Thus, motor MG1 is driven to generate torque that is specified by a torque control value TR1. In addition, during regenerative braking of a hybrid car having a motive-power output device mounted thereon, inverter 30 converts an alternating-current voltage generated by motor MG1 to a direct-current voltage based on signal PWM1 from control device 70, and supplies that converted direct-current voltage to boost converter 20 via capacitor C2. It is noted that the regenerative braking as used herein includes braking which involves power regeneration after there was foot brake operation by a driver driving a hybrid car, or decelerating (or suspending acceleration of) a vehicle with power regeneration by, despite the absence of foot brake operation, not pressing the accelerator pedal during travel.

Further, in response to signal PWM1 from control device 70, inverter 30 drives motor MG1 such that an alternating-current voltage VAC for commercial power supplies can be output from low-voltage charging and power-feeding unit 90.

When supplied with the direct-current voltage from capacitor C2, inverter 40 converts the direct-current voltage to an alternating-current voltage to drive motor MG2 based on a signal PWM2 from control device 70. Thus, motor MG2 is driven to generate torque that is specified by a torque control value TR2. In addition, during regenerative braking of a hybrid car having a motive-power output device mounted thereon, inverter 40 converts an alternating-current voltage generated by motor MG2 to a direct-current voltage based on signal PWM2 from control device 70, and supplies the converted direct-current voltage to boost converter 20 via capacitor C2.

Further, in response to signal PWM2 from control device 70, inverter 40 drives motor MG2 such that alternating-current voltage VAC for commercial power supplies can be output from lines 92A, 92B of low-voltage charging and power-feeding unit 90.

A current sensor 14 detects a motor current MCRT1 passing through motor MG1, and outputs that detected motor current MCRT1 to control device 70. A current sensor 15 detects a motor current MCRT2 passing through motor MG2, and outputs that detected motor current MCRT2 to control device 70.

Low-voltage charging and power-feeding unit 90 includes a primary coil 51 and a secondary coil 52. Primary coil 51 is connected between neutral point Ml of three-phase coil 11 included in motor MG1 and neutral point M2 of three-phase coil 12 included in motor MG2. Low-voltage charging and power-feeding unit 90 converts an alternating-current voltage generated between neutral point M1 of motor MG1 and neutral point M2 of motor MG2 to alternating-current voltage VAC for commercial power supplies, and outputs resultant alternating-current voltage VAC from low-voltage charging and power-feeding unit 90.

Figure 6:
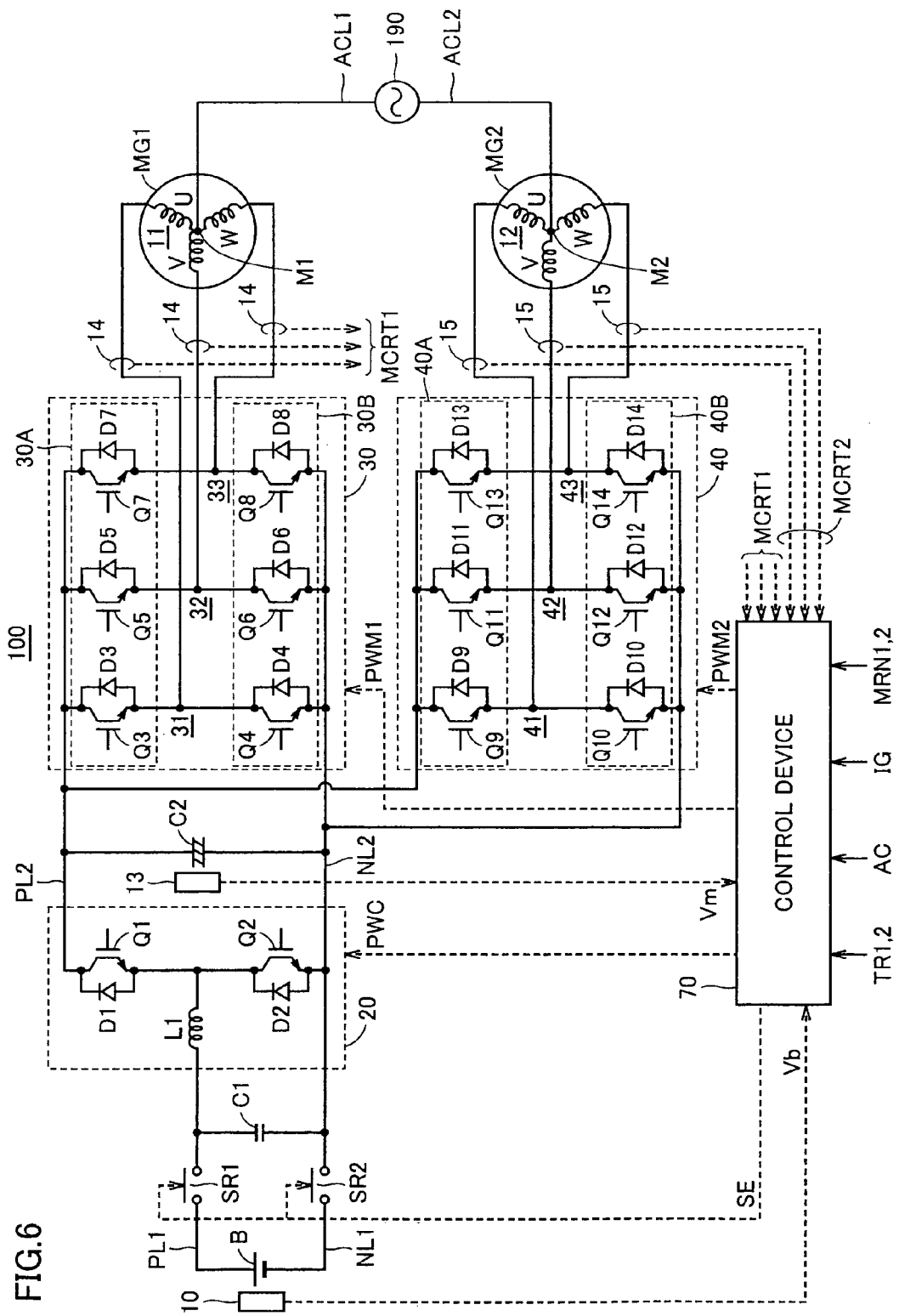
FIG. 6 is a schematic block diagram of the hybrid vehicle during battery charging.

FIG. 6 is a schematic block diagram of hybrid vehicle 100 in the present embodiment. With reference to FIG. 6, a method of supplying an alternating current of 100V from connector 190A to battery B to charge battery B will be described. In FIG. 6, in each inverter 30, 40 constituted of a three-phase bridge circuit, there are eight patterns of ON/OFF combinations of the six transistors. An interphase voltage becomes zero in two of the eight switching patterns, and such a voltage state is referred to as a zero voltage vector. With the zero voltage vector, three transistors of the upper arm may be regarded as being in the same switching state (all on or off), and three transistors of the lower arm may also be regarded as being in the same switching state. In FIG. 6, therefore, the three transistors of the upper arm of inverter 30 are collectively indicated as an upper arm 30A, and the three transistors of the lower arm of inverter 30 are collectively indicated as a lower arm 30B. Likewise, three transistors of the upper arm of inverter 40 are collectively indicated as an upper arm 40A, and three transistors of the lower arm of inverter 40 are collectively indicated as a lower arm 40B.

As shown in FIG. 6, this zero-phase equivalent circuit may be considered as a single-phase PWM converter having single-phase alternating-current power provided to neutral points M1, M2 via power input lines ACL1, ACL2 of connector 190A as input. Accordingly, by varying the zero voltage vector in each of inverters 30, 40, and performing switching control such that inverters 30, 40 operate as arms of the single-phase PWM converter, alternating-current power input from power input lines ACL1, ACL2 may be converted to direct-current power, to be output to positive electrode line PL2. That converted direct-current voltage is supplied to boost converter 20 via capacitor C2, to charge battery B.

While the present embodiment has been described as being applied to a hybrid vehicle having a monocoque body, it is not limited thereto. For instance, it may also be applied to a hybrid vehicle having a body with a frame.

Moreover, while the present embodiment has been described based on the so-called series-parallel hybrid among hybrid types, it is not limited to this type. That is, it may also be applied to a hybrid type (series hybrid) including an engine as an internal combustion engine which requires refueling, and a motor for running which drives wheels using power generated by this engine or/and power stored in a battery. Furthermore, it may also be applied to a parallel hybrid in which an engine and a motor are both capable of outputting motive power to a driving shaft.

Although the hybrid vehicle according to the present embodiment employs the method of using neutral M1, M2 of motors MG1, MG2 as a method of charging battery B and a method of feeding power to the outside via low-voltage charging and power-feeding unit 90, it is not limited thereto. For instance, a device dedicated for charging/power-feeding having the functions of an inverter and the functions of a DC/DC converter may be provided, and the device dedicated for charging/power-feeding may be used to perform charging and power-feeding.

While the embodiments of the present invention have been described as above, it should be understood that the embodiments disclosed herein are illustrative and non-restrictive in every respect. The scope of the present invention is defined by the terms of the claims, and is intended to include any modifications within the scope and meaning equivalent to the terms of the claims.

INDUSTRIAL APPLICABILITY

The present invention is applicable to a hybrid vehicle, and is particularly suitable to a hybrid vehicle including a first connection unit capable of receiving a first outside connection unit through which a low current passes, and a second connection unit capable of receiving a second outside connection unit through which a current higher than in the first connection unit can pass.

The invention claimed is:

1. A hybrid vehicle comprising:
    an internal combustion engine that generates motive power;
    a motor that generates motive power for driving a wheel;
    a driving mechanism accommodation room that accommodates the motor and the internal combustion engine;
    a power storage that stores power for driving the motor;
    a first connection unit that receives a first outside connection unit, the first connection unit supplying power to the power storage or/and supplying power stored in the power storage to outside of the vehicle through the first outside connection unit; and
    a second connection unit that receives a second outside connection unit through which a current higher than in the first outside connection unit can pass, the second connection unit supplying power to the power storage or/and supplying power stored in the power storage to the outside of the vehicle through the second outside connection unit, and the second connection unit being provided farther away from the driving mechanism accommodation room than is the first connection unit.

2. The hybrid vehicle according to claim 1, further comprising a traveler accommodation room that accommodates a traveler, wherein
    the driving mechanism accommodation room is located on a front side of the vehicle in a traveling direction of the vehicle with respect to the traveler accommodation room, and
    the first connection unit is provided on the front side of the vehicle in the traveling direction of the vehicle with respect to the second connection unit, and is connected to the power storage via the motor.

3. The hybrid vehicle according to claim 2, further comprising a converter that converts power supplied from the second connection unit and supplies resultant power to the power storage or/and converts power supplied from the power storage and supplies resultant power to the second connection unit, wherein
    the second connection unit is connected to the power storage via the converter, and
    the power storage is provided on a rear side of the vehicle in the traveling direction of the vehicle with respect to the driving mechanism accommodation room.

4. The hybrid vehicle according to claim 2, wherein
the first connection unit is provided on a front end surface of the vehicle located on the front side of the vehicle in the traveling direction of the vehicle, and the second connection unit is provided on a rear end surface of the vehicle located on a rear side of the vehicle in the traveling direction of the vehicle.

5. The hybrid vehicle according to claim 1, wherein
    the motor includes a first motor having a first polyphase winding and a first neutral point of the first polyphase winding, and a second motor having a second polyphase winding and a second neutral point of the second polyphase winding,
    the first connection unit includes a first line connected to the first neutral point and a second line connected to the second neutral point,
    the hybrid vehicle further comprises
    a first inverter that supplies power from the power storage to the first motor,
    a second inverter that supplies power from the power storage to the second motor, and
    an inverter control unit that controls the first and second inverters such that alternating-current power provided from the first connection unit to the first and second neutral points is converted to direct-current power and supplied to the power storage, or/and controls the first and second inverters such that a direct current supplied from the power storage to the first and second inverters is converted to an alternating current and supplied from the first connection unit to an external load.

6. The hybrid vehicle according to claim 1, wherein
    the motor includes a first motor having a first polyphase winding and a first neutral point of the first polyphase winding, and a second motor having a second polyphase winding and a second neutral point of the second polyphase winding,
    the first connection unit includes a first line connected to the first neutral point and a second line connected to the second neutral point,
    the hybrid vehicle further comprises
    a first inverter that supplies power from the power storage to the first motor,
    a second inverter that supplies power from the power storage to the second motor, and an inverter control unit that controls the first and second inverters such that alternating-current power provided from the outside of the vehicle to the first and second neutral points through the first connection unit is converted to direct-current power and output to the power storage.

7. The hybrid vehicle according to claim 1, wherein
the first connection unit is located closer to the motor than is the second connection unit, and
the second connection unit is located closer to the power storage than is the first connection unit.

8. The hybrid vehicle according to claim 1, wherein the first connection unit is provided on a front end surface of the vehicle located on a front side of the vehicle in a traveling direction of the vehicle, and the second connection unit is provided on a rear end surface of the vehicle located on a rear side of the vehicle in the traveling direction of the vehicle.

9. A hybrid vehicle comprising:
a vehicle main body;
an internal combustion engine that generates motive power;
a motor that generates motive power for driving a wheel;
a driving mechanism accommodation room formed in the vehicle main body and that accommodates the motor and the internal combustion engine;
a traveler accommodation room formed in the vehicle main body and that accommodates a traveler, the traveler accommodation room being located on a rear side of the vehicle main body in a traveling direction of the vehicle relative to the driving mechanism accommodation room;
openings formed in the vehicle main body, the openings connecting to the traveler accommodation room and through which the traveler can exit and enter the vehicle main body;
a power storage that stores power for driving the motor;
a first connection unit that receives a first outside connection unit, the first connection unit supplying power to the power storage or/and supplying power stored in the power storage to outside of the vehicle through the first outside connection unit; and
a second connection unit that receives a second outside connection unit through which a current higher than in the first outside connection unit can pass, the second connection unit supplying power to the power storage or/and supplying power stored in the power storage to the outside of the vehicle through the second outside connection unit, the first connection unit being located on a front side of the vehicle main body in the traveling direction of the vehicle relative to the openings, and the second connection unit being located on the rear side of the vehicle main body relative to the openings.

10. The hybrid vehicle according to claim 9, further comprising a converter that converts power supplied from the second connection unit and supplies resultant power to the power storage or/and converts power supplied from the power storage and supplies resultant power to the second connection unit, wherein
the second connection unit is connected to the power storage via the converter, and
the power storage is provided on the rear side of the vehicle in the traveling direction of the vehicle with respect to the driving mechanism accommodation room.

11. The hybrid vehicle according to claim 9, wherein
the first connection unit is provided on a front end surface of the vehicle located on the front side of the vehicle in the traveling direction of the vehicle, and the second connection unit is provided on a rear end surface of the vehicle located on the rear side of the vehicle in the traveling direction of the vehicle.

12. The hybrid vehicle according to claim 9, wherein
the motor includes a first motor having a first polyphase winding and a first neutral point of the first polyphase winding, and a second motor having a second polyphase winding and a second neutral point of the second polyphase winding,
the first connection unit includes a first line connected to the first neutral point and a second line connected to the second neutral point,
the hybrid vehicle further comprises
a first inverter that supplies power from the power storage to the first motor,
a second inverter that supplies power from the power storage to the second motor, and
an inverter control unit that controls the first and second inverters such that alternating-current power provided from the first connection unit to the first and second neutral points is converted to direct-current power and supplied to the power storage, or/and controls the first and second inverters such that a direct current supplied from the power storage to the first and second inverters is converted to an alternating current and supplied from the first connection unit to an external load.

13. The hybrid vehicle according to claim 9, wherein
the motor includes a first motor having a first polyphase winding and a first neutral point of the first polyphase winding, and a second motor having a second polyphase winding and a second neutral point of the second polyphase winding,
the first connection unit includes a first line connected to the first neutral point and a second line connected to the second neutral point,
the hybrid vehicle further comprises
a first inverter that supplies power from the power storage to the first motor,
a second inverter that supplies power from the power storage to the second motor, and
an inverter control unit that controls the first and second inverters such that alternating-current power provided from the outside of the vehicle to the first and second neutral points through the first connection unit is converted to direct-current power and output to the power storage.

14. The hybrid vehicle according to claim 9, wherein
the first connection unit is located closer to the motor than is the second connection unit, and
the second connection unit is located closer to the power storage than is the first connection unit.

* * * * *

UNITED STATES PATENT AND TRADEMARK OFFICE
CERTIFICATE OF CORRECTION

| | | |
|---|---|---|
| PATENT NO. | : 8,084,882 B2 | Page 1 of 1 |
| APPLICATION NO. | : 12/449473 | |
| DATED | : December 27, 2011 | |
| INVENTOR(S) | : Takaya Soma et al. | |

It is certified that error appears in the above-identified patent and that said Letters Patent is hereby corrected as shown below:

On the cover page, item (87), the PCT publication date should be listed as follows:

PCT Pub. Date: September 12, 2008

Signed and Sealed this
Thirteenth Day of March, 2012

David J. Kappos
*Director of the United States Patent and Trademark Office*